United States Patent [19]

Soulalioux

[11] Patent Number: 5,639,326
[45] Date of Patent: Jun. 17, 1997

[54] TIRE MOLD AND TIRE MOLDING PROCESS

[75] Inventor: Alain Soulalioux, Clermont-Ferrand, France

[73] Assignee: Sedepro, Paris, France

[21] Appl. No.: 336,785

[22] Filed: Nov. 9, 1994

[30] Foreign Application Priority Data

Nov. 23, 1993 [FR] France .................... 93 13523

[51] Int. Cl.$^6$ .................... B29C 35/02
[52] U.S. Cl. .................... 156/110.1; 156/394.1; 264/326; 264/501; 425/46; 425/47
[58] Field of Search .................... 156/394.1, 123, 156/127, 110.1; 425/46, 47, 20, 23, 19; 264/326, 501, 502

[56] References Cited

U.S. PATENT DOCUMENTS

| | | |
|---|---|---|
| 2,333,588 | 11/1943 | Schaevitz .................... 425/46 |
| 2,840,857 | 7/1958 | Lett .................... 425/20 |
| 2,874,405 | 2/1959 | Stanford . |
| 3,609,819 | 10/1971 | Searle .................... 425/47 |
| 3,779,677 | 12/1973 | Greenwood . |
| 4,895,692 | 1/1990 | Laurent et al. . |
| 5,120,209 | 6/1992 | MacMillan .................... 425/46 |
| 5,234,326 | 8/1993 | Galli et al. . |
| 5,290,163 | 3/1994 | Katsumata et al. . |
| 5,492,669 | 2/1996 | Laurent et al. .................... 425/47 |

FOREIGN PATENT DOCUMENTS

| | | |
|---|---|---|
| A1933816 | 1/1971 | Germany . |
| A2113698 | 9/1972 | Germany . |

*Primary Examiner*—Geoffrey L. Knable
*Attorney, Agent, or Firm*—Brumbaugh, Graves, Donohue & Raymond

[57] ABSTRACT

The sector mold (11) is designed so that, during the molding phase, the molding elements (10, 10a, 10b, 10c) are all equidistant due to devices (13) which assure an elastic repulsion between each other. Some of the elements glide circumferentially with respect to their sector (11) in the final closing phase. In this way, pinching of the rubber between sectors and the appearance of molding burrs are avoided.

19 Claims, 5 Drawing Sheets

TIRE MOLD AND TIRE MOLDING PROCESS

BACKGROUND OF THE INVENTION

The present invention relates to the molding of tires and, in particular, the molding of the tread of tires.

In order to assure a molding of excellent quality, numerous conditions must be satisfied. One of these conditions specifically concerns the operation of the removal from the mold of the tread which must also impose as few constraints as possible on the tire, subject otherwise to causing disturbances, in particular in the reinforcement architecture of the tire. This leads to a preference for the so-called "sector molds", illustrated for instance in U.S. Pat. No. 3,779,677, rather than the so-called "2-part" molds, such as that described for example in U.S. Pat. No. 2,874,405.

Furthermore, it is desirable that, particularly at the level of the tread, there be no burr due to rubber which has flowed between two molding elements, for instance between two sectors. For this reason, in general, the mold is closed (all sectors adjoining each other) before imposing additional shaping on the raw tire. This additional shaping is obtained by increase in the pressure prevailing in the shaping bladder, which causes the rubber of the tread to penetrate into the elements molding the tread pattern.

Now, in certain tire architectures comprising zero degree reinforcements in the crown, it is difficult or even impossible to contemplate additional shaping in a vulcanization press. The raw tire is then assembled to a size closer to or substantially equal to the size of the vulcanized molded tire. The penetration of the molding elements into the rubber can then take place before the closed position. This results in a flow of rubber in peripheral direction, which may result in substantial burrs at the planes of joints between sectors.

In order to remedy this problem, the design of the tread pattern has up to now been varied; namely the placing of wear indicators to the interfaces between sectors or a decrease in the extent of cutting of the tread patterns upon approaching the edges of sectors. This makes it possible to increase the volume of rubber of the tread pattern at these places so as to absorb small peripheral flows of rubber. These are only palliators that do not contribute to increasing the quality of the tires or treads produced.

These molding constraints result from the fact that, in a sector mold, since each sector covers a relatively large angle, the molding is purely radial only in the median zone of each sector. Upon observing the movement of advance of the sectors, it is noted that the molding is radial only at the level of the median plane of each sector. The molding takes place in a direction which forms a given angle with respect to the radial direction, which angle is larger the further one moves away, in circumferential direction from this median position, in order to reach the edges of the sectors. The maximum value of this angle corresponds in general to half the angular development of the sector.

Developing this finding for molds having numerous successive pattern units along the perimeter, as is generally true of passenger car tires, it is noted that, in so-called "sector" molds, the number of sectors remains considerably smaller than the number of successive pattern units, which leads to a relatively large circumferential size of each sector (typically one eighth of the perimeter for a passenger-car tire).

Even though this type of mold constitutes a considerable advance over the two-part molds, which are without any radial movement upon opening or closing, it cannot truly be considered that sector molds effect a radial molding of the tread. Considering one sector of the mold and assuming that it is displaced radially with respect to the axis of the mold, this means that the actual displacement noted is parallel to a radius at any point on the molding surface of the sector in question. A purely radial movement at the level of the molding surface is obtained only for a single circumferential position. The actual movement differs from the theoretical radial direction for every other point of the molding surface.

Stated differently, only the points of said molding surface which intersect the reference radius of the radial displacement in question describe a pure radial movement. All the other points describe a movement parallel to said radius, and more or less different from it.

This movement breaks down therefore into a radial component and a circumferential component, the latter being undesirable and may be considered an "induced" component. By observing on one sector, during a radial stroke corresponding substantially to the depth of the tread pattern, the size of this induced displacement which follows a circumferential component instead of a pure radial direction, it is noted that said circumferential component reaches a value on the order of 0.2% of the molded perimeter in the case of a conventional mold having eight sectors.

This induced circumferential movement causes, upon the molding, flows of rubber directed towards the circumferential edges of the sectors, that is to say, towards the interface between the adjacent sectors. This parasitic movement contributes to the appearance of molding burrs which appear on the tread of a vulcanized tire. One object of the invention is to correct these molding defects which the burrs constitute.

U.S. Pat. No. 4,895,692 describes a completely rigid mold having a peripheral ring of sectors for molding the tread, two lateral shells for molding the side walls (outer surfaces of the tire), and a rigid core for molding the inner surface of the tire. Since there is no additional shaping, the use of this mold frees the tire designer from a constraint specific to that phase of the molding. The completely rigid design of this mold results in numerous advantages as to the quality of the molded tire, since the geometrical shapes obtained are of high quality (excellent circularity, in every transverse position). However, the imposed volume molding makes it necessary to maintain very narrow tolerances with respect to the volume of the raw blanks of the tire.

Another object of the invention is to be able to retain the advantage of the rigid mold from the standpoint of respect for and perfect control of the geometrical quality of the tires manufactured with this type of mold while making the molding operation less sensitive to differences in volume between the raw blanks of the tires to be molded and vulcanized successively in the same mold.

The mold of the present invention not only makes it possible to achieve these objectives but it also contributes a general improvement to the molding and removal from the mold of the tires, whether or not use is made of a rigid core in order to mold the inner cavity of the tire.

SUMMARY OF THE INVENTION

The invention proposes a mold for a tire tread which, in molding position, defines a continuous ring having a relief composed of successive pattern units in the circumferential direction, the said pattern units assuring the molding of the tread pattern on the radially outer surface of the tread, the said mold being formed of elements which are individually movable along a direction towards or away from the axis of the mold, at least during a final molding stroke, the molding of the said tread being assured by the radially inner face of each element, the said elements being also movable with respect to each other at least while they move along the said final stroke, characterized by the fact that each of said elements has a circumferential development corresponding to one of said pattern units.

If one considers a mold having, for instance, thirty individually movable elements, which is produced in accordance with what is proposed in the present invention, then, upon analyzing the movement of the molding surface made as above, it is noted that the said induced circumferential component does not exceed 0.04% of the perimeter. It is noted that the difference between the extreme circumferential components of the displacement noted at any point of the molding surface is far less than what is currently obtained in the present state of the art. Now, the number of thirty elements constitutes in fact generally, in accordance with the experimental findings carried out, a lower limit in the practical embodiment of the present invention.

Thus, in accordance with another aspect of the invention, the said elements, which are individually movable with respect to the axis of the mold and also movable with respect to the others, at least while they move along the said final stroke, have a circumferential dimension which is sufficiently small so that the difference between the extreme circumferential components of the displacement observed at all points of the molding surface of each element is less than 0.04% of the molding perimeter.

In accordance with this aspect of the invention, it can be considered that the movement is very substantially radial in all positions circumferential to the molding surface of said elements. This effectively limits the parasitic flow of rubber upon the molding.

In accordance with another aspect of the present invention, the tire tread mold, defining in the molding position a continuous ring which assures the molding of the radially outer surface of the tread, said ring being formed of at least thirty circumferentially adjacent elements in molding position, the radially inner face of each element assuring the molding of said tread, is characterized by the fact that said elements are movable individually along a direction towards or away from the axis of the mold, at least on a final molding stroke, towards and from the closed position, and by the fact that it comprises means which assure elastic repulsion in the circumferential direction between each of the said elements.

The elements in question here have a thickness (dimension in circumferential direction) such that they do not deform elastically under the operating stresses. This means that their elasticity does not play a functional role in the present invention. They are not adjacent plates so that their number remains less in all cases than 250.

The invention finds use for the a manufacture of annular treads such as used in prevulcanized state in certain cold recapping methods. In such case, the base of the tread is molded by a bladder or by a rigid shape.

The invention can also be used for the molding of a tire. In that case, the mold also comprises means for molding the side walls, for instance shells, such as are well known. The inner cavity of the tire can be molded by a bladder or by a rigid core, the invention being compatible with both methods.

DESCRIPTION OF THE DRAWINGS

The following figures illustrate two embodiments of the invention when it is applied to the manufacture of tires, which will be more than sufficient for the person skilled in the art to understand the invention and all its advantages.

DESCRIPTION OF PREFERRED EMBODIMENTS

Figure 1:
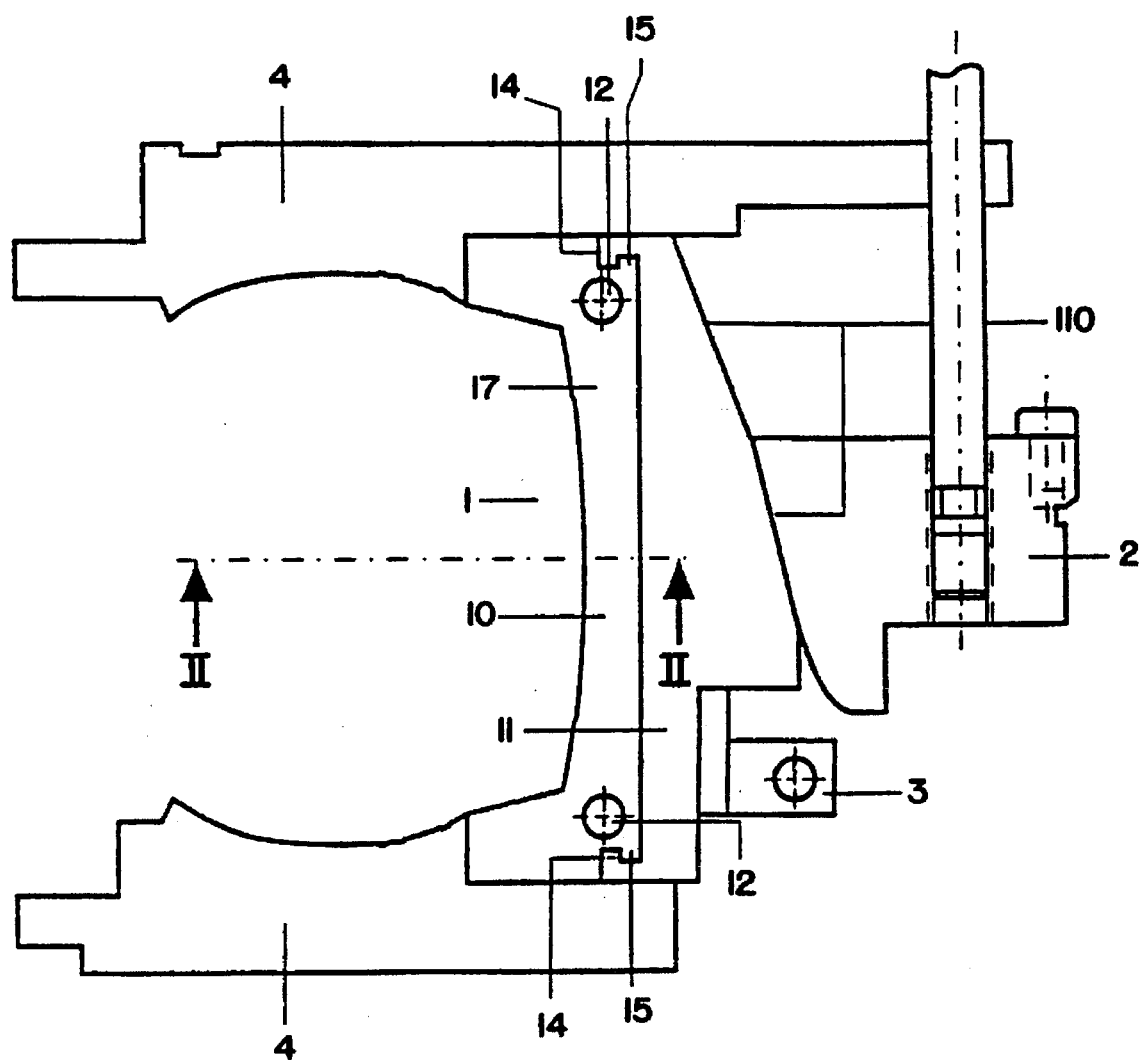
FIG. 1 is a meridian section through a mold in accordance with the invention.

FIG. 1 shows a continuous ring 1 intended to mold the radially outer surface of the tread. The ring is formed of sectors 11 the number of which is generally between five and twenty, elements 10 for the molding of the tread pattern being mounted on them.

The size of these elements in the circumferential direction is selected in such a manner as to constitute one withdrawable pattern unit. By this, it is meant that the removal from the mold pattern unit can be effected in a single removal direction, causing only slight elastic deformations to the rubber which has just been molded and vulcanized.

Figure 2:
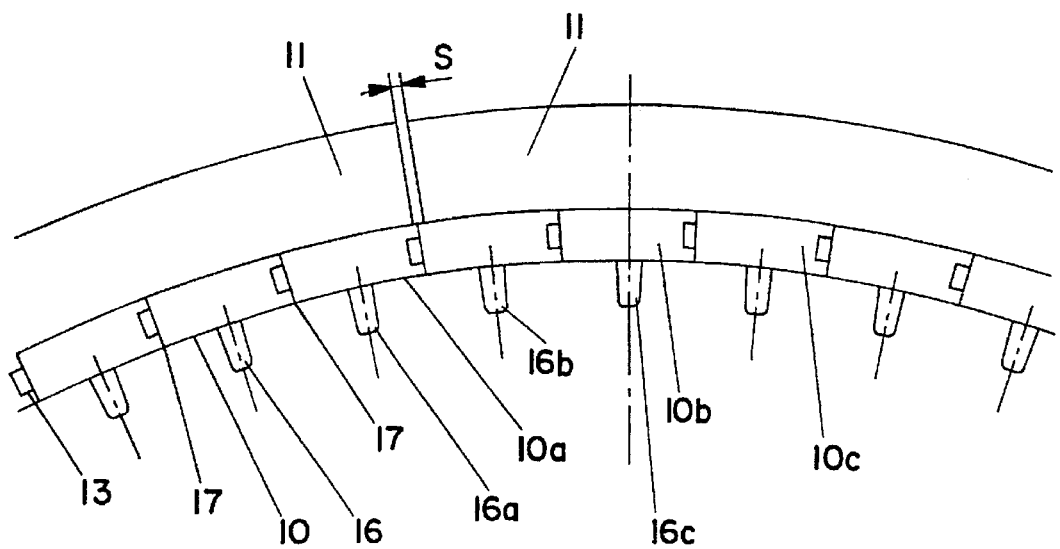
FIG. 2 is a cross section perpendicular to the axis of the mold, along the line II—II of FIG. 1.
Figure 3:
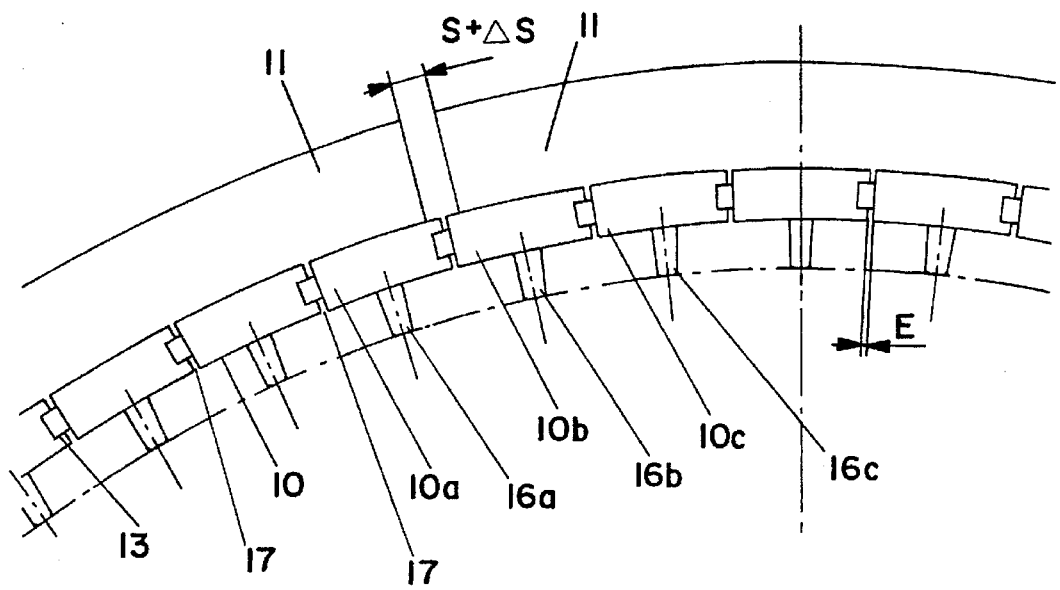
FIGS. 3 and 4 are views similar to FIG. 2, showing two different stages of the opening of the mold.
Figure 4:
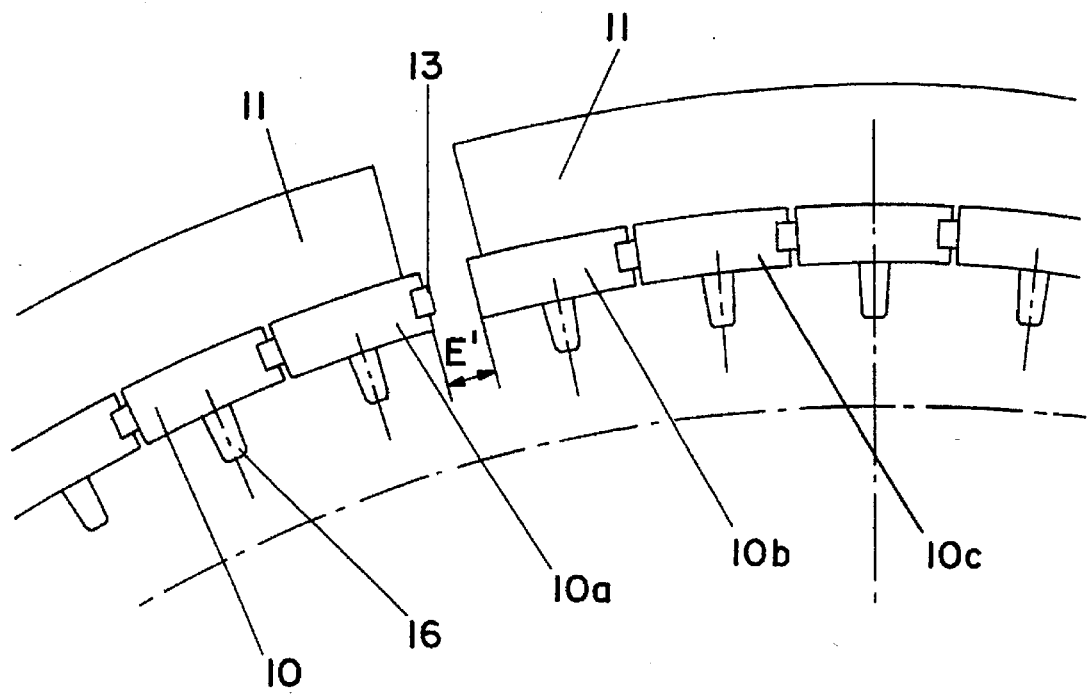

In numerous cases, the withdrawable pattern unit can correspond to the pitch of the tread pattern, a conventional concept with respect to the tread pattern for treads of tires. In general, for most tread patterns, there is then a direction of removal from the mold for which all the elements 10 are without undercut. This is what is shown in FIGS. 2 to 4. However, an element on which two adjacent pitches appear will also frequently constitute one withdrawable unit.

Each element can be obtained in any suitable manner. In particular, the methods of manufacturing elements by aluminum casting, which is widespread in the tire industry, are suitable. The exact shape of these elements, seen from the central axis of the mold, may follow the tread pattern units contemplated by the designer of the tire (transverse faces not necessarily flat).

One can also arrange several elements which are separated transversely as shown in U.S. Pat. No. 5,234,326. In that case, the said elements are distributed in one or more axially adjacent groups so that, within a given group, they are all movable in a direction forming the same angle with respect to the radial direction. The said means which assure elastic repulsion are arranged between the elements of one and the same group, a group being formed by a circumferential row of elements.

Returning to FIG. 1, it is seen that the mold comprises a single element 10 transversely. The back of each sector 11 has two frustoconical surfaces 110. Each element 10 is slipped onto its sector 11 by means of two lateral grooves 14 provided on each sector 11 and corresponding tenons 15 developed on the rear face of each element 10. There can also be noted two shells 4 for the molding of the sidewalls, as well a lug 3 on the back of the sector 11 and a conical collar 2 which is movable axially.

The radial movement of the section 11 into the open position is obtained by releasing the conical collar 2 in order to unlock the mold and then pulling on each sector 11 by means of the lug 3. The closing of the assembly of sectors 11 is obtained by axially displacing the collar 2, which acts on the frustoconical surfaces 110 on the back of each sector 11 and assures tight locking of the mold. All of these movements are conventional and it is not necessary to describe them in detail.

Figure 5:
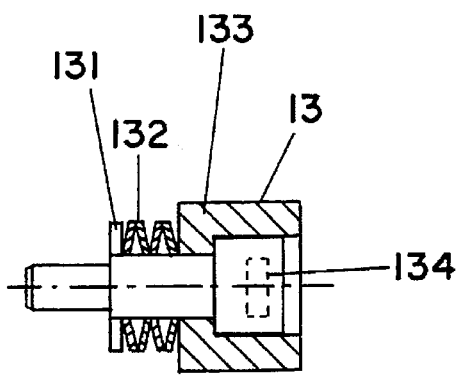
FIG. 5 shows an enlarged sectional view of a component of the invention.

One of the transverse faces 17 of each element 10 (see FIGS. 2, 3 and 4) comprises two recesses 12 on opposite sides of the plane of symmetry II—II (see FIG. 1) receiving a device 13 capable of assuring a force of repulsion between elements. This is shown in detail in FIG. 5.

The device 13 comprises a collar 131 intended to rest on the bottom of a recess 12. It comprises a head 133 and a stack of Belleville washers 132. It is fastened on the bottom of a recess 12 by the screwing of a bolt 134. The recess 12 is hollowed in such a manner that the bolt 134 is not flush, while permitting the head 133 to protrude slightly with respect to the transverse face 17 when the device 13 is mounted but not pushed. In this way, the bearing reactions of the said elements 10 on each other, that is to say, the circumferentially directed bearing reactions, tend continuously to move the elements 10 away from each other.

In FIG. 2, all the sectors 11 of the mold are in closed position. They are separated from each other by a distance S. It can be seen that all the elements 10 adjoin each other except for a slight clearance, the purpose of which is to assure the venting of the mold.

In FIG. 3, the sectors 11 have all recoiled by a given stroke which preferably corresponds to the depth of the tread pattern. It is seen that the sectors 11 are separated from each other by an additional distance ΔS due to the recoil. Contrary to what would be the case with a sector mold such as those of the prior art, this distance ΔS is not present again at the level of the molding surface of the mold. The molding elements 10 have all remained equidistant. The distance E which separates them is equal to several tenths of a millimeter. This is made possible by the sliding of most of the elements 10 in the grooves 14 of the sectors (see FIG. 1) under the action of the repulsion devices 13 developing a sufficient force to overcome the existing frictional forces. It may be noted that said forces are rather slight since, at least during the said stroke, both in molding phase and in mold-removal phase, the radial pressure which the rubber exerts on the mold is slight or none.

The mold can then continue its opening movement continuing the recoil of the sectors 11 in order to reach or pass a position such as that shown in FIG. 4. This time, during the movement, all the elements 10 remain stationary with respect to the sector 11 on which they are mounted. The distance E' between edge elements of the adjacent sectors can increase freely without this having any effect on the operation of the removal of the tread from the mold.

Let us now effect a comparative observation of FIGS. 2 and 3. A rib 16 has been shown on each element 10. During the stroke corresponding to the depth of the tread pattern, it is seen that the direction of movement of all the elements 10 is always substantially radial at every point of the molding surface, due to the small circumferential dimension of each element 10.

It will thus be understood that the volume of rubber, which, during a molding operation, is clamped between the ribs 16a and 16b belonging to different sectors is the same as that clamped between the ribs 16b and 16c belonging to the same sector (not taking into account the variable nature of the pitch of certain tread patterns). In any event, the theoretical volume available between the ribs 16 of any pair of adjacent elements 10 corresponds to the volume of rubber actually imprisoned by the said ribs 16 during the molding.

More generally, the direction of molding and of mold removal is a direction of movement towards or away from the axis of the mold. It is not necessarily radial, but can form an angle other than zero with respect to the radial direction should this prove of greater interest. Certain tread patterns, in fact, have non-radial incisions, like the slices of the M+S 100 tires marketed by MICHELIN.

In the event that the mold, seen in radial section, has several axially adjacent elements, it is said, by convention, that it has several groups of elements. One can choose to develop it in this way in order, for instance, to follow a tread pattern pitch which is different on the left and on the right of the tire. The directions of molding/mold-removal can be controlled separately in each group. Within each group all the elements forming part thereof follow the same direction of movement to or away from the axis of the mold.

Figure 6:
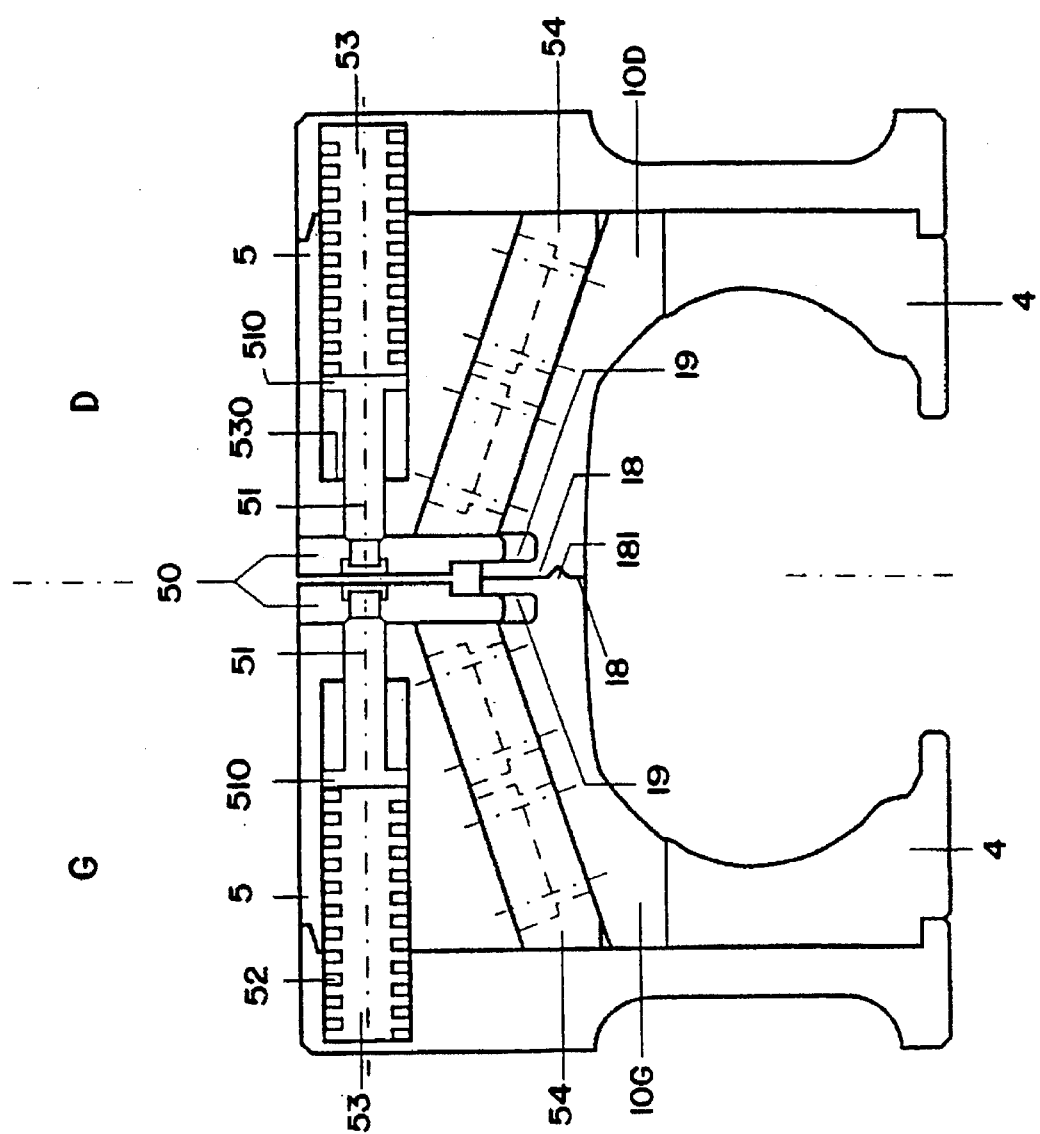
FIG. 6 shows a second variant embodiment of the invention.
Figure 7:
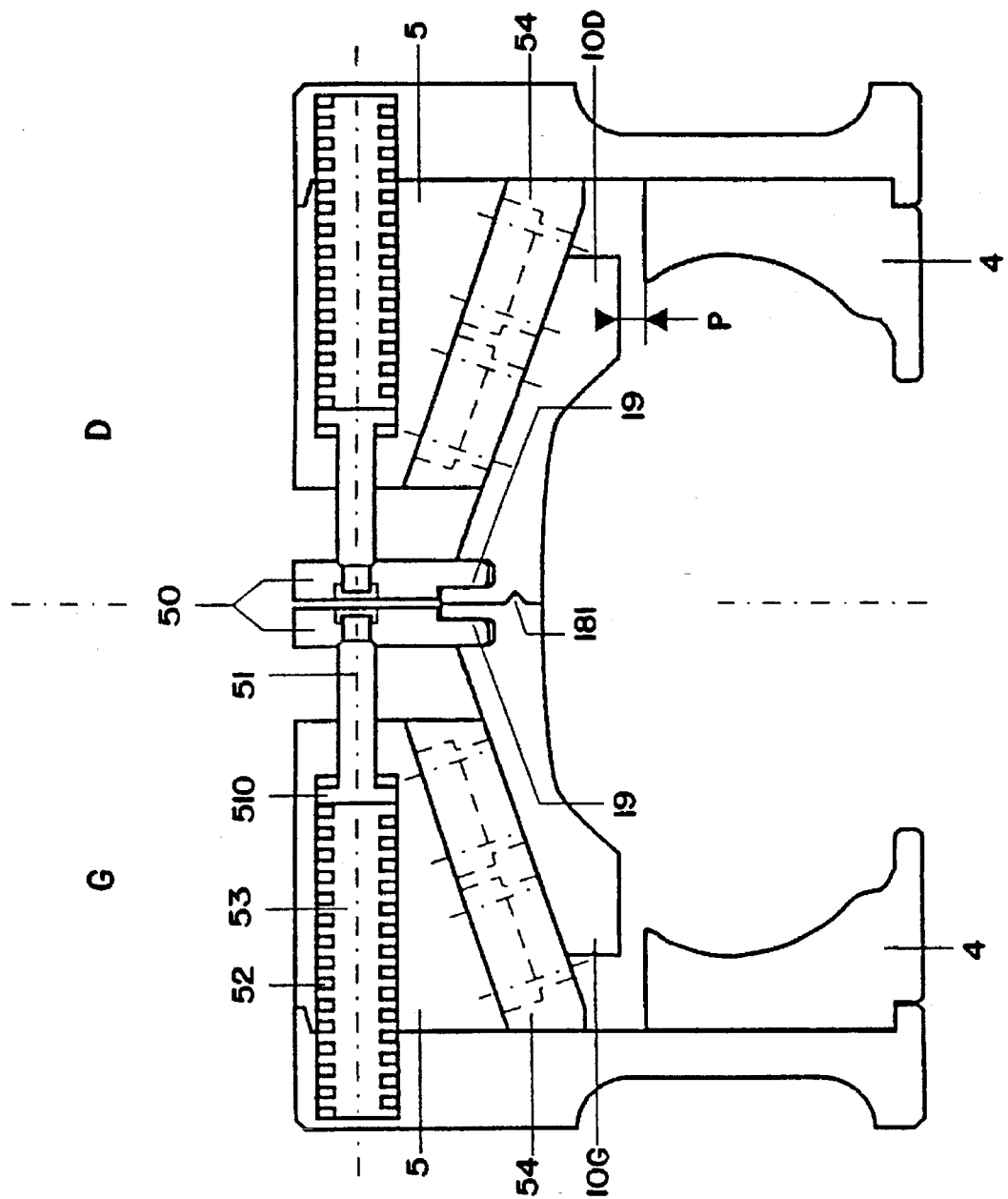
FIG. 7 shows the mold of the second variant during the opening phase.

There has just been described a first variant embodiment in which each element extends transversely over the entire width of the said crown, that is to say, from one shoulder of the tire to the other. FIGS. 6 and 7 illustrate another variant embodiment of the invention in which the ring assuring the molding of the tread pattern has been divided into two parts G (left) and D (right). Each of them comprises, transversely, a single element 10G or 10D. This arrangement is not limitative; there could be several groups of elements on one of the parts or on both the parts G and D. In the peripheral direction, in the manner of the first variant, each part comprises a large number of molding elements 10G or 10D, for example as many as there are tread-pattern units.

This makes it possible to produce a mold, commonly referred to as a "two-part" mold, which separate into two substantially identical halves upon the opening necessary for removal from the mold.

This type of mold, which was in common use for molding bias tires, was abandoned in favor of the so-called "sector" mold upon the change to radial tires, since it is preferable, in this case, to be able to move the sectors away radially upon the removal from the mold. However, the mold proposed in the present invention, in its two-part version, makes it possible to combine the greater simplicity of the two-part mold with the ability of opening by radial recoil of the elements which move radially away from the axis of the mold. There is assimilated here to "shell" 4 both the molding part and the mechanical support on which it rests. A crown 5, the role of which is to be control the movement of the elements 10G (or 10D) as explained below, is mounted on each of the shells 4. It goes without saying, however, that this arrangement is not limitative and that these parts could, in certain embodiments, be movable with respect to the others.

A centering bead 181 is arranged on the side face 18 of the elements 10G of the part G. It cooperates with a corresponding groove developed on the side face 18 of the elements 10D of the other part. The back of each element 10G, 10D has a contact face 19 in engagement axially with a collar 50.

The collar 50 is integral with several pistons 51, for instance at least three, distributed equidistantly on the entire circumference of the collar 50. In order to actuate each of these pistons 51, a spring 52 is arranged in a recess 53. The spring rests at the one end against the shell 4 and on the other end against the piston 51 in order to tend to push the latter axially towards the inside until a shoulder 510 provided on the base of the piston 51 comes against the bottom 530 of the corresponding recess 53.

A slideway 54, for instance a dovetail, is, on the one hand, slidably interlocked with the back of each element 10G, 10D and, on the other hand, fastened on the radially lower wall of a crown 5. This slideway 54 constitutes an arrangement which assures a degree of freedom of sliding between elements 10G or 10D and crown 5. The said sliding takes place along an axis inclined with respect to the axis of the mold. The angle of inclination is selected so as to be non-wedging, with respect to the opening and closing stresses of the mold, which are directed parallel to the axis of the mold.

In the preferred variant embodiment of the mold described above, it is possible to obtain all the movements necessary for the molding and mold-removal operation simply by acting on the shells 4. Let us assume that one starts from the closed position (see FIG. 6). If one moves the shells 4 axially away from each other then, by the action of the springs 52, the elements 10G and 10D remain in contact with each other via their side faces 18. The elements move back radially to assume the position illustrated in FIG. 7. This explains the opening movement of the mold. Preferably, the radial recoil stroke "P" is just greater than the depth of the tread pattern since the continuation of the opening of the mold takes place while continuing the relative radial moving away of the shells 4.

If one brings the shells 4 axially towards each other, then the only possible movement of the elements 10G (or 10D), in response to the axial bringing together of the shells 4, is a movement of radial advance towards the closed position of the mold. This explains the closing of the mold. The movement of all the elements 10G (or 10D) is preferably simultaneous and symmetrical. The centering bead 181 makes it possible to assure perfect symmetry.

When such a mold is used with a rigid core which molds the inner surface of the tire, it then preferably has means (not shown) which make it possible to terminate the closing of the mold by a small axial stroke of the shells 4 after all of the elements 10G and 10D have arrived at the closed position. This makes it possible to obtain the piston effect between shell and crown, the role of which is described in U.S. Pat. No. 4,895,692 (cited above).

The invention also extends, as already mentioned, to a method of manufacturing a tire employing a mold such as just described and which can comprise a rigid core serving as support for the assembling of the parts, then serving as element molding the inner cavity of the tire during the vulcanization.

The advantage which resides in using this type of mold combined with a rigid core is that, in this case, this confers upon the mold a certain elasticity, that is to say a certain ability slightly to increase the volume of the molding cavity in order to accompany the expansion of the rubber resulting from the increase in temperature, while perfectly distributing the clearances between mold parts. This is obtained by allowing the shells 4 or, more precisely, the crowns 5, to recoil axially beyond a certain pressure prevailing in the molding cavity of the tire. Furthermore, this dispenses from the necessity of having to close the ring molding the tread in two successive phases. This simplifies the press and limits the space taken up by it in the radial direction.

Of course, the two-part mold of the second embodiment can be used with repulsion devices 13 described in the first variant. They replace or assist the springs 52.

As to molding burrs, it is observed that the most critical molding conditions appear along longitudinal troughs extending around the tire and, to be sure, in cases in which there is no supplementary shaping at all. The longitudinal troughs are molded by ribs which must not be circumferentially continuous. These ribs are cut into as many sections as there are elements 10 (or 10G or 10D). It has been noted experimentally that, even when using a rigid core to mold the inside of the tire, if at the time when the ribs of the mold penetrate into the raw rubber, the size of the differences between elements is smaller than 0.3 mm, then no molding burr appears.

The use of a number of elements 10G or 10D which corresponds substantially to the pitch of the tread pattern leads to having, for passenger car tires for instance, 70 elements to cover the circumference of the tire and therefore 70 clearances between elements. The total of all the clearances is equal to $0.3 \times 70 = 21$ mm. This corresponds to a radial stroke of $21/2\pi = 3.3$ mm, corresponding substantially to half of the depth of the tread pattern. Now, it is known that it is possible to confer upon the rubber of the tread, seen in radial section, a profile which approaches the profile of the vulcanized tire. It is thus possible for the ribs not to penetrate into the raw rubber before a final stroke corresponding to a fraction of the depth of the tread pattern.

I claim:

1. A method of manufacturing a tire in a mold, comprising:

assembling a raw rubber blank, introducing said rubber blank into a mold having a plurality of individual molding elements arranged in an annular ring, said plurality of elements defining, in closed molding position, a continuous annular molding surface on their radially inner faces, said continuous annular molding surface having a relief for the molding of a tread pattern on the radially outer surface of said tread, said continuous annular molding surface having a plurality of pattern units in the circumferential direction, each individual one of said elements having a circumferential length corresponding to one of said pattern units, each pattern unit defining only one pitch or two pitches, repulsion means being interposed between adjacent molding elements to separate them when they are arranged in an annular ring in a retracted position and providing an elastic repulsion in the circumferential direction between each of said elements at least during a final molding stroke and in the molding position, moving said elements to impart a contraction and enlargement to said ring of molding elements, including a relative circumferential movement between the elements coordinated with a movement of all of the elements along a direction toward and away from the axis of the mold between a retracted open and a closed molding position, said direction forming substantially the same angle with respect to the radial direction for each element.

2. A method of manufacturing a tire according to claim 1, wherein the tire is progressively assembled on a rigid core serving as support for the assembling of the component parts, the core then serving as a molding element for the inner cavity of the tire during the vulcanization.

3. A mold for a tire tread comprising at least 30 molding elements, defining, in molding position, a continuous annular ring for molding the radially outer surface of the tread, said elements being circumferentially adjacent in molding position, the radially inner face of each element molding a portion of said tread, the circumferential length of each individual molding element defining only one pitch or two pitches, repulsion means interposed between adjacent molding elements to separate them when they are arranged in an annular ring in a retracted position and providing an elastic repulsion in the circumferential direction between each of said elements at least during a final molding stroke and in the molding position.

4. A mold according to claim 3, wherein said elements are distributed in one or more axially adjacent circumferential groups so that, within a group, they are all movable along a direction forming the same angle with respect to the radial direction, and wherein said means providing an elastic repulsion are arranged between the circumferentially adjacent elements of the same group.

5. A mold according to claim 3, wherein said elements are mounted on at least five sectors, with clearance between elements, and by the fact that, during the movement corresponding to said stroke, the elements can slide circumferentially with respect to said sectors.

6. A mold according to claim 3, wherein said ring is divided into two parts (G, D) which can move axially away from each other, each mounted on a crown, which crowns can be moved axially away from or towards each other, each part containing at least one group of elements.

7. A mold according to claim 6, wherein each part comprises a single group of elements, the back of each element having a contact face in engagement axially on the outer side with a continuous peripheral collar, and wherein means which exert a force of extension having a component parallel to the axis of the mold are arranged between the crown and the collar.

8. A mold according to claim 6, wherein each element is mounted on one of the crowns by means of a device which permits a degree of freedom of sliding between the element and the said crown, the said sliding taking place along an axis inclined with respect to the axis of the mold, so that a movement in an axial direction of a crown results in a movement in a radial direction of said elements, at least during the said stroke corresponding to the depth of the tread pattern.

9. A mold according to claim 3, wherein each of said elements has, on one of its non-molding transverse faces opposite a non-molding transverse face of the adjacent element, at least one recess accommodating an elastic repulsion means.

10. A mold for a tire tread comprising a plurality of molding elements which in a retracted open position of the mold are spaced apart circumferentially in a ring, actuating means to impart a contraction and enlargement to the ring of molding elements, including a relative circumferential movement between the elements coordinated with a movement of all of the elements along a direction toward and away from the axis of the mold between a retracted open position and a closed molding position, said direction forming substantially the same angle with respect to the radial direction for each element, repulsion means interposed between adjacent molding elements to separate them when they are arranged in an annular ring in a retracted position and providing an elastic repulsion in the circumferential direction between each of said elements at least during a final molding stroke and in the molding position, said plurality of elements defining, in closed molding position, a continuous annular molding surface on their radially inner faces, said continuous annular molding surface having a relief for the molding of a tread pattern on the radially outer surface of said tread, said continuous annular molding surface having a plurality of pattern units in the circumferential direction, each individual one of said elements having a circumferential length corresponding to one of said pattern units, each pattern unit defining only one pitch or two pitches.

11. A mold according to claim 10, wherein said pattern units are repetitive pattern units defining one pitch of the tread pattern.

12. A mold according to claim 11, wherein each of said elements accommodates, on one of its non-molding transverse faces opposite a non-molding transverse face of the adjacent elements, at least one elastic repulsion means.

13. A mold according to claim 10, wherein the said elements are distributed in one or more axially adjacent circumferential groups and wherein, within a circumferential group, they are all movable in a direction forming the same angle with respect to the radial direction.

14. A mold according to claim 10, wherein said elements are mounted on at least five sectors, with clearance between elements, and by the fact that, during the movement corresponding to said stroke, the elements can slide circumferentially with respect to said sectors.

15. A mold according to claim 10, wherein said ring is divided into two axially separable parts (G, D), each mounted on a crown, which crowns can be moved axially towards or away from each other, each part containing at least one group of elements.

16. A mold according to claim 15, wherein each part comprises a single group of elements, the back of each element having a contact face axially in engagement on the outer side with a continuous peripheral collar, and wherein means exerting a force of extension having a component parallel to the axis of the mold are arranged between the crown and the collar.

17. A mold according to claim 15, wherein each element is rigidly attached on a crown by a device which assures a degree of freedom of sliding between the element and said crown, the said sliding taking place along an axis which is inclined with respect to the axis of the mold, so that a movement in an axial direction of a crown results in a movement in a radial direction of the said elements, at least during said stroke corresponding to the depth of the tread pattern.

18. A mold for a tire tread comprising a plurality of molding elements arranged in an annular ring, the circumferential length of each individual molding element defining only one pitch or two pitches, actuating means to impart contraction and enlargement to said ring of molding elements, including a relative circumferential movement between the elements coordinated with a movement of all of the elements along a direction toward and away from the axis of the mold between a retracted open and a closed molding position, said direction forming substantially the same angle with respect to the radial direction for each element, said plurality of elements defining, in closed molding position, a continuous annular molding surface on their radially inner faces, repulsion means interposed between adjacent molding elements to separate them when they are arranged in an annular ring in a retracted position and providing an elastic repulsion in the circumferential direction between each of said elements at least during a final molding stroke and in the molding position, each of said elements having a circumferential length sufficiently small that the difference between the extreme circumferential components of the displacement observed at all points of the molding surface of each element is less than 0.04% of the molding perimeter at least during said final molding stroke.

19. A mold for tire tread comprising a plurality of molding elements arranged circumferentially in an annular array, resilient repulsion means interposed between each of the molding elements and the circumferentially adjacent molding elements to maintain them substantially equally spaced apart in a retracted position, actuating means to impart contraction and enlargement to said annular array of molding elements, including a relative circumferential movement between the elements coordinated with a movement of all of the elements along a direction toward and away from the axis of the mold between a retracted open and a closed molding position, said direction forming substantially the same angle with respect to the radial direction for each element, said plurality of elements defining, in a closed position, a continuous annular molding surface on their radially inner faces, said continuous annular molding surface having a relief for the molding of a tread pattern on the radially outer surface of a tread, said continuous annular molding surface having a plurality of pitches in the circumferential direction, each individual one of said elements having a circumferential length corresponding to one pitch.

* * * * *